No. 883,928.

PATENTED APR. 7, 1908.

A. F. BATCHELDER.
VALVE FOR AIR COMPRESSORS.
APPLICATION FILED OCT. 29, 1900.

Witnesses.
Harry W. Tilden
Helen Oxford

Inventor.
Asa F. Batchelder.
by [signature]
Att'y.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

VALVE FOR AIR-COMPRESSORS.

No. 883,928.   Specification of Letters Patent.   Patented April 7, 1908.

Application filed October 29, 1900. Serial No. 34,708.

*To all whom it may concern:*

Be it known that I, ASA F. BATCHELDER, a citizen of the United States, residing at Schenectady, county of Schenectady, State of New York, have invented certain new and useful Improvements in Valves for Air-Compressors, of which the following is a specification.

My invention relates to air-compressors, and it consists in a valve for controlling the inlet and the outlet to the compression cylinder.

The especial features of this valve which render it novel and useful are hereinafter fully set forth and particularly pointed out in the claims.

The object of the construction is to render the valve noiseless, and cause it to wear evenly and keep the meeting surfaces clean; furthermore, to afford the largest circumferential opening possible in a given area, thereby insuring a minimum lift of the valve; also, to make the valve as light as possible in order to insure prompt action and a reduction of vibration and noise.

Figure 1:
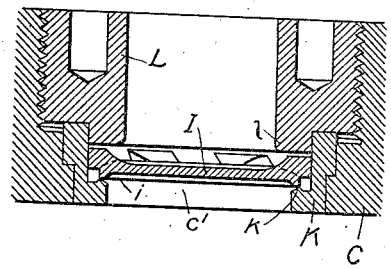
Figure 5:
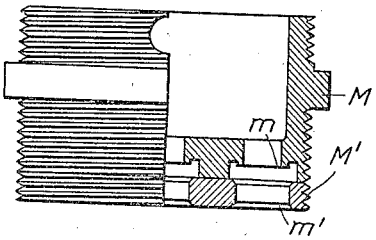
Figure 6:
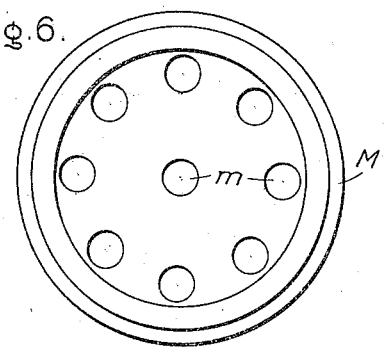
Figure 2:
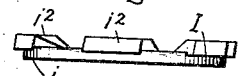
Figure 3:
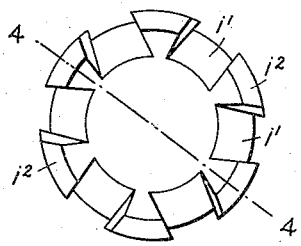
Figure 7:
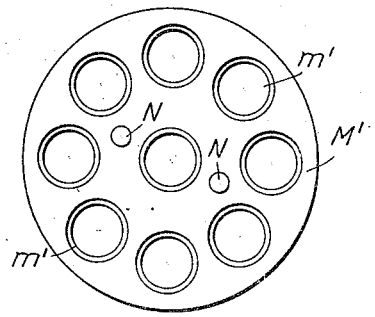
Figure 4:
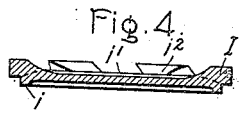

In the accompanying drawing, Figure 1 represents a vertical axial section of a casing fragment containing a valve constructed in accordance with the present invention; Fig. 2 is a view of the valve proper; Fig. 3 is a plan view thereof; Fig. 4 is a central axial section of the valve; Fig. 5 is a half sectional elevation of a casing containing a plurality of valves; Fig. 6 is a top plan view of the same; and Fig. 7 is a bottom plan view thereof.

In Fig. 1 I have shown one of my improved valves in position in the casing or head C of an air compressor. In said head C is arranged the opening $c^1$ through which the air enters the cylinder if the valve is used as an inlet valve, or through which it leaves the cylinder if the valve is employed as an outlet valve, the particular arrangement of parts illustrated being that for adapting the valve for use as an outlet valve.

The valve I consists of a flat disk, shown in the drawings as imperforate, which is countersunk or dished upon the upper and under sides for the sake of lightness. On the under side there is left a narrow annular rib $i$, which constitutes the face of the valve. The thickened edge of the valve is provided with radial notches $i^1$, leaving between them radial wings $i^2$ projecting beyond the annular face $i$.

As shown in Fig. 1, the valve stops on the annular face and seat when shut, and on the wing guides $i^2$ against the valve keeper when open. The wing guides $i^2$ project above the disk on the side opposite the valve seat, thus enabling the air which has passed between the valve and its seat, and through the openings between the wing guides $i^2$, to continue its course between the disk and the valve keeper. All the edges over which the air has to pass, except those of the valve seat, are rounded, thus forming a path of low resistance for the air, and preventing whistling. The edges of the notches $i^1$ are inclined to the axis of the disk circumferentially of the disk and in the same general direction relative to the periphery of the disk so that one edge of each wing is undercut, and the opposite edge is beveled, as clearly appears from an inspection of Figs. 2, 3 and 4. The edge of the disk between the wings is rounded off, as indicated by the dotted lines in Fig. 4. The valve can be operated either vertically with either side up, or horizontally, as convenient in any particular case. This valve is received in a bushing K, which is fitted into the opening $c^1$ in the head C of the cylinder. The bushing contains a narrow annular seat $k$, upon which the annular face $i$ of the valve seats. The bushing is slightly larger in diameter than the valve, so that the latter can play loosely and freely within the bushing, being guided therein in its vertical movements by the edges of the wings $i^2$, which engage with and are guided by the inner walls of the bushing. The inner diameter of the bushing is but very slightly larger than the valve, and the wing guides $i^2$ engage the walls of the bushing, so that if one side of the valve sticks, the other side can move without jamming the valve in the chamber. Ample area of air passage is provided between the wing guides $i^2$ and the edges of the disk and the walls of the bushing. The valve is retained within the bushing by a keeper L, which has the form of a bushing or gland and is screwed into a screw-threaded enlargement of the upper part of the opening $c^1$ in the head of the cylinder. The keeper is provided with a downwardly-projecting flange $l$ which terminates a short distance above the radial wings of the valve when it rests upon its seat. The radial wings $i^2$ engage the flange $l$, and the valve is stopped thereby, when it is forced open.

It will be seen that the air, in passing by the edges of the valve, can flow smoothly over the rounded or beveled edges of the bushing L and valve proper, so that it is not obstructed and thus any tendency to produce a whistling noise is avoided.

It will be seen that a valve constructed as above described has a maximum circumferential opening for a given area. This results in a minimum lift of the valve, and this being the condition, which for any given time of action means a minimum velocity of the valve when in motion, it follows that a comparatively noiseless valve action is secured. Furthermore, the lightness of the valve insures a reduction of the inertia of the moving parts, which effects a reduction in the effort and the time in which the valve is started from a state of rest, and also results in a reduction of the noise and vibration with which it is stopped at either end of its stroke. Furthermore the raised annular valve-seat and valve-face are especially convenient for grinding, and being flat, permit a limited amount of side play by the valve on the valve seat, which tends to keep the parts absolutely air-tight and effects a constant removal of dust or other foreign substances from said surfaces. This construction also permits the interchange of valves. Furthermore, the pressure of the air passing by the inclined faces of the wings produces a slight partial rotation of the valve on its seat at each lift, which results in an even wear of the valve-face and seat and tends to keep the parts clean and tight. Since the wing guides $i^2$ will be eventually rubbed over the entire inner wall of the valve chamber, and also over the exposed surface of the valve keeper, these parts also will be kept clean and free from any oily gum which would otherwise be deposited on them.

Valves of the above described construction are well adapted for use in apparatus not specially designed for them as shown herein.

In Figs. 5, 6 and 7, I have shown a modification in which a casing M is provided containing a plurality of air passages each surrounded by an annular seat $m$. The valve-keeper $M^1$ is secured on the end of the casing M by dowels N or otherwise, and is provided with a plurality of openings $m^1$ preferably provided with rounded or beveled edges and registering with the air passages in the casing M. The edge of the valve-keeper $M^1$ is screw-threaded and flush with the outer surface of the casing M, so that the casing and keeper can be screwed into a suitably tapped opening in the head of the cylinder of an air-compressor. The valve keeper $M^1$ forms the end of the valve chamber nearest the cylinder, and forms the surface on which the wing guides $i^2$ of the valves, strike to stop the valves when they are moved from their seats. Each chamber in the casing between the openings $m$ and $m^1$ is provided with a small disk-valve of the construction hereinbefore described. The advantage of using a plurality of valves is that, while they apparently operate at the same time, yet there are differences in the actual times of their similar action which operate to reduce appreciably the volume of sound below what it would be if their action was absolutely simultaneous. The course taken by the air currents may be followed in Fig. 5. Starting from the atmosphere and the strainer, it passes into the hollow part of the casing or valve seat M, then through the holes $m$, then around the lifted valves in the chambers between the holes $m$ and $m^1$, and finally through the holes $m^1$.

What I claim as new and desire to secure by Letters Patent of the United States is:

1. A valve for air-compressors, consisting of a disk having countersunk upper and lower sides, a narrow annular face on one side, and radial wings on the other side, one edge of said wings being undercut and the other edge having a bevel.

2. A valve for air-compressors consisting of a disk having countersunk upper and lower sides, a narrow annular face on one side, and radial wings on the other side having their edges inclined to the axis of the disk, the edge of the disk between the wings being rounded.

3. A valve-casing for air-compressors, containing a plurality of air passages, a valve-keeper secured upon said casing and having a corresponding number of passages forming with those of the casing a plurality of chambers, and a disk-valve in each chamber having a narrow annular face on one side and a series of radial wings on the other side provided with inclined edges.

4. A valve for air-compressors, consisting of an imperforate disk having a projecting annular face on one side, and radial wings projecting beyond the edge of the disk, one edge of each wing being undercut and the other edge beveled.

5. A valve casing for air-compressors, containing a plurality of air passages, a valve keeper secured upon said casing and having a plurality of passages registering with those in the casing, and a plurality of disk valves controlling said passages, each having an annular face on one side, and a series of radial wings with inclined edges.

6. A valve which comprises a disk having an annular rib on one surface, and on the other laterally projecting wing guides including intermediate passages between them, said wing guides having their edges inclined to the axis of the disk in the same general direction relative to its periphery for the purpose of effecting a partial rotation of said disk when it is operated.

7. The combination with a valve seat having an end diaphragm having one or more openings, of a valve keeper having corresponding openings, and disk valves in the chambers between the diaphragm and keeper.

8. The combination with a valve casing having valve chambers formed with raised seats, of disk valves in the chambers, said valves having ribs engaging the raised seats, and having also laterally projecting wing guides engaging the walls of the chambers, said wing guides having their edges inclined to the axis of the disk in the same general direction relative to its periphery for the purpose of producing a partial rotation of said valves when they are raised from their seats as the air flows through said casing.

9. A valve for air compressors consisting of a disk having countersunk upper and lower sides and a narrow annular face on one side and radial wings on the other side, a corresponding edge of each of said wings being inclined to the axis of the disk.

10. A valve for air compressors consisting of a disk having an annular rib on one side and on the other side laterally-projecting wings including intermediate passages between them, a corresponding edge of each of said wings being inclined to the axis of the disk.

11. The combination with a valve casing having a plurality of shallow valve chambers, of a disk valve having a narrow annular rib on one side and a series of inclined radial wings on the other side arranged within and freely movable within the limits of each of said chambers.

12. The combination with a valve casing having a plurality of shallow valve chambers, of disk valves having a narrow annular rib on one side and on the other side a series of radial wings, a corresponding edge of each of which is under-cut, said valves being arranged within and freely movable within the limits of each of said chambers.

In witness whereof I have hereunto set my hand this 27th day of October, 1900.

ASA F. BATCHELDER.

Witnesses:
BENJAMIN B. HULL,
MARGARET E. WOOLLEY.